Patented Mar. 23, 1926.

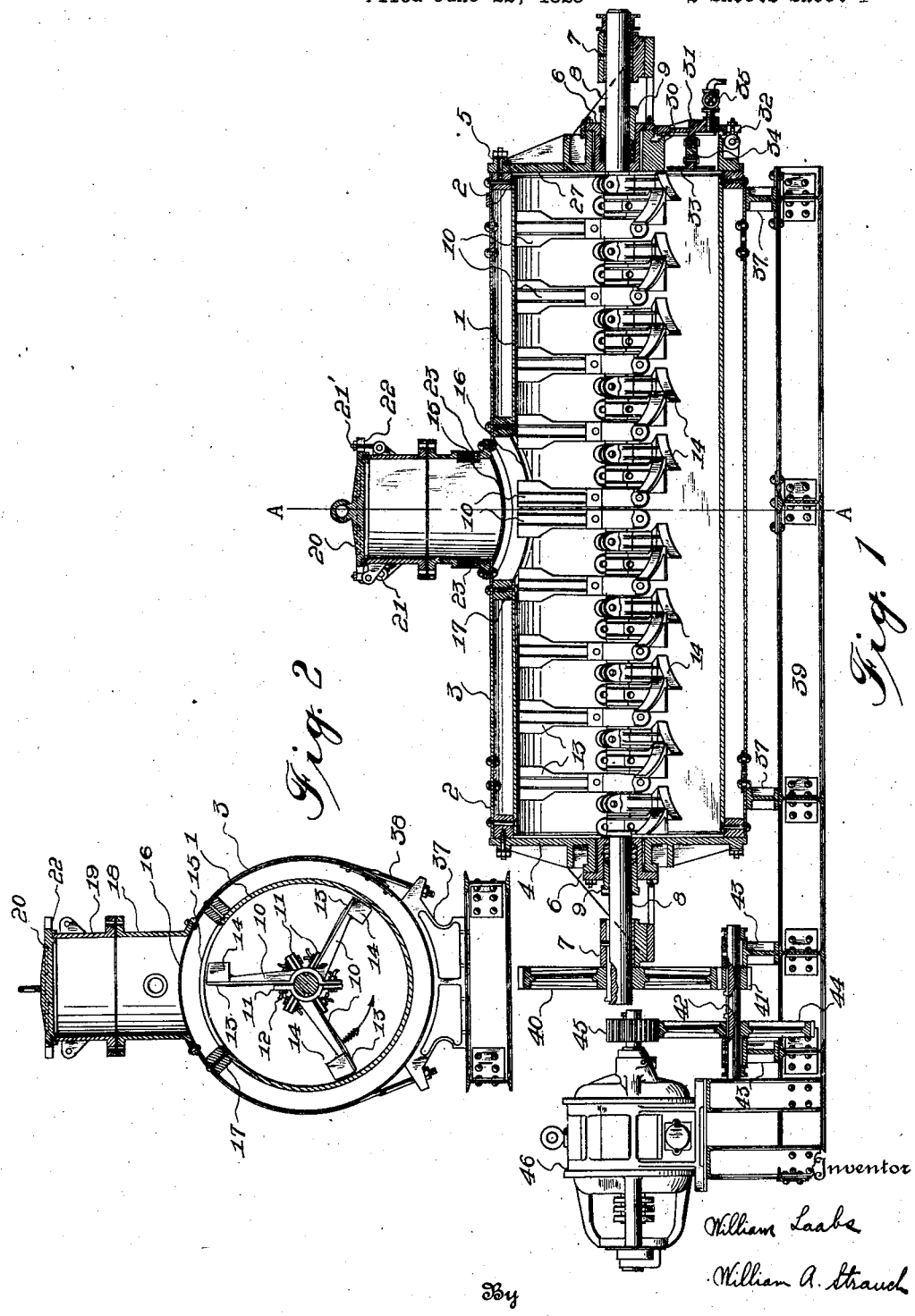

1,578,245

UNITED STATES PATENT OFFICE.

WILLIAM LAABS, OF MILWAUKEE, WISCONSIN, ASSIGNOR TO THE ALLBRIGHT-NELL COMPANY, OF CHICAGO, ILLINOIS.

PROCESS OF RENDERING FAT AND OIL CONTAINING SOLIDS OF ANIMAL ORIGIN.

Application filed June 22, 1925. Serial No. 38,809.

*To all whom it may concern:*

Be it known that I, WILLIAM LAABS, a citizen of the United States, residing at Milwaukee, in the county of Milwaukee and State of Wisconsin, have invented certain new and useful Improvements in Processes of Rendering Fat and Oil Containing Solids of Animal Origin, of which the following is a specification.

The present invention relates to processes for rendering fat and oil containing solids, and the present application is a continuation in part of copending application S. N. 496,276, filed August 29, 1921.

More particularly the invention relates to improved processes for rendering solids containing fats and oils of animal origin, such as, edible and inedible animal fats, packing house offal, shop scraps, fish, fish waste, dead animals, table refuse, garbage and the like; and to the production of food or fertilizer meals from the residue.

Two general methods have been heretofore utilized in rendering materials of the character above set forth known in the art as the wet and the dry rendering methods. The most commonly used is the wet rendering process, which is carried out in general by putting the parts to be rendered into a rendering tank with or without preliminary disintegration or grinding, and by means of heat produced by jets of live steam and agitation due to the action of the steam jets in free water, which is added to the material in the tank, the solids to be rendered are disintegrated and the fats and oils are released. The excess water used in the process dissolves a large percentage of the albuminous and the gluey matters from the solids, and due to the action of the heat and excess water, decomposition of the mass proceeds rapidly, resulting in a considerable percentage of free fatty acids in the rendered fats and oils. The rendered fats are, however, clean and free from absorption of glues and discoloring foreign substances and are of bleachable quality. After cooking from four to ten hours the mass is allowed to settle, and after three or four hours setting the clear fats are withdrawn. From the beginning of the process it is customary to vent the tanks to allow air and foul smelling gases of decomposition to escape. When the odors of the escaping gases become too pronounced they are vented from the tank and passed through a condenser. After the fats and oils are withdrawn, the tank waters, bones and meat fibers, known as tankage, remain and must be disposed of. The usual practice is to drain away the tank waters and to evaporate the same to a sirupy condition producing a black liquid known as stick. The bone material and meat fibers are usually pressed in hydraulic presses to eliminate as much as possible of the adhering tank waters, and the remainder is then dried down in fertilizer driers. At the time of drying down of the meat fiber and bone material it is customary to add the stick to the material in the dryer. The material from the dryer is reduced to a meal which is used for stock food or fertilizer. According to the percentages of stick recovered, the meal produced in this way will contain from 8 to 12 per cent ammonia content. If the stick is not recovered from the tank waters the ammonia content of the stock food or fertilizer is very low and the water soluble constituents of the materials have been removed or lost. The meals manufactured from the residue are of low grade, having offensive odors and even when the stick is recovered from the tank waters and added thereto, the ammonia content seldom exceeds 12 per cent.

The other well known and commonly used method of rendering is that known as dry rendering. In this method the material is heated to melt the fats by application of indirect heat, usually in steam jacketed cookers or kettles, while the evolved gases and vapors are permitted to escape as formed. The material is ordinarily agitated by rotating stirrers during the melting operation and the heating and stirring is carried on until the cracklings are browned or slightly crisped. The material is then discharged into a percolator or strainer where the free hot fats and oils are drained off. The fats are settled and cooled, and the cracklings are pressed in suitable hydraulic or high pressure screw presses to remove the remaining fats. It has long been well known that fresh animal parts of all kinds, when dry rendered, give off vapors which are not offensive. For this reason the rendering of fresh materials may be carried out in open kettles without creating objectionable odors. In the production of lower grade animal products, however, especially in smaller establishments, the materials to be rendered are frequently more or less decomposed when put into dry rendering cookers or melters and the vapors evolved are foul. For this reason it has been long the practice in dry rendering to use enclosed steam jacketed melters in which the vapors and gases have been withdrawn as evolved and condensed or otherwise treated to effect deodorization.

In the handling of fats by the common dry rendering methods the materials are heated substantially above 230 degrees Fahrenheit after the moisture content of the solid residue or cracklings is reduced below the range of 15 to 20 per cent. As a result, rendered products are discolored and injured in quality by absorption of glues and contaminating nitrogenous substances and the bleachability of the fats is partially or totally destroyed. The moisture content in the solids also bears a close relation to the quantity of fats which may be expressed therefrom at the end of the heating or melting stage. If the materials are discharged from the melter before the moisture content of the cracklings is reduced below the range of 15 to 20 per cent, the fats will be high in quality and free from discoloration, but when the solids are expressed in this condition to remove the fats remaining therein, mucilaginous and glue-like substances are expressed with the fats, and a poorly pressed solid residue containing a high percentage of fat is obtained. The fat percentage in the solid residue under the best conditions will range from five or six per cent upward and the yield of fats is accordingly less than that obtained in the usual wet rendering processes, in which substantially all of the fats are removed from the solids.

The fats obtained in the wet rendering process are free from mucilaginous and discoloring substances while dry rendered fats are ordinarily discolored but have a lower percentage of free fatty acids than the wet rendered product, because no excess water is heated with the fats during the rendering operation. The sterilization of the solid residue is more effective in the wet rendering processes, but the large volumes of polluted waters to be disposed of, the attendant decomposition, offensive odors, loss of water soluble content of the solids, and the low grade of meal produced by the wet process are serious disadvantages which are avoided by the dry processes.

The solid residue from the dry rendering processes is of much higher grade than the residue from the well known wet rendering processes, and when suitable materials are rendered, the cracklings may be made into food fit for human beings. For lower grade products, the residue is made into stock food and fertilizers, and it has been for many years well known that the meals produced in the dry rendering processes are superior in quality to the meals produced from the tankage of wet rendering systems. In the usual method of dry rendering materials which contain relatively large pieces of bone, either before heating or after draining and before pressing, it is necessary to grind the material in order to reduce the bone to a size which may be handled by the press. Because of the rapid escape of the steam, bone particles treated in this manner tend to become hard or flint-like in character and tend to rapidly wear the bodies of continuous presses. These bone particles are more or less indigestible and insoluble and are unsatisfactory for this reason in both food and fertilizer meals. Before they become available in fertilizers and can be absorbed by the soil they must lie a sufficient time to decompose. Materials without the bone content, however, reduce to high grade foods and fertilizers in which all of the water soluble solids ordinarily lost in wet rendering are retained.

The principal objects of the present invention are to provide sanitary processes for rendering materials in which all of the advantages of the prior wet and dry rendering processes above set forth are attained, and the disadvantages are substantially eliminated; to provide processes in which high grade bleachable fats with substantially no discoloration are produced, in which complete sterilization of the product is attained without substantial decomposition of the mass and the formation of free fatty acids, and in which the water soluble substances are retained in the solid residue. Other objects of the invention are such as may be attained by utilization of the various principles and steps hereinafter set forth and as defined by the terms of the appended claims.

In general the invention is carried out by subjecting the materials to be rendered to steam pressures substantially above atmospheric pressure in the presence of sufficient moisture to prevent injury to the quality of the fats at rendering temperatures of 212 degrees Fahrenheit and upward, but insufficient in amount to cause a solution of any substantial percentage of the gluey, mucilaginous or nitrogenous constituents of the materials in water as the material disintegrates under the action of the steam. The pressure is maintained and the excess moisture is preferably withdrawn continuously until the fat and oil containing solid particles are reduced to a disintegrated, sticky or gummy condition or state, and the solid structure thereof is reduced to a condition where the fats and oils contained therein are largely freed therefrom. At the end of the pressure cooking or disintegrating stage the moisture content of the cracklings or solid residue should preferably be above 17 and below 35 per cent, excellent results having been obtained in practice in handling beef offal when the moisture content of the cracklings or solid residue in the materials was reduced to 27% at the end of this stage. In the disintegrating stage, sterilizing temperatures will penetrate the entire mass and complete sterilization of the solids will be effected. The degree of sterilization is such that the solid residue from diseased animal carcasses may be safely used as stock foods. The preferred method of generating the disintegrating steam pressures is to heat the material to be rendered in a closed jacketed vessel by the application of indirect heat thereto, so that the steam is generated from the natural moisture content, and the moisture absorbed by and adhering to the materials in the ordinary processes of manufacture, washing to free from dirt and like operations. During the disintegrating period excess steam developed is preferably vented or exhausted, and in this way a substantial part of the moisture content is eliminated as the disintegration proceeds. After the required degree of disintegration has been effected, the moisture remaining in the mass is removed as rapidly as possible with the temperatures of the mass reduced below 240 degrees Fahrenheit and preferably below 212 degrees Fahrenheit as the moisture content of the cracklings passes below 20 per cent until the moisture content of the cracklings is reduced to the point where the fats and oils may be separated from the solid residue free from contaminating nitrogenous, mucilaginous, or gluey substances. This is preferably accomplished by reducing the pressures in the vessel substantially below the digesting steam pressures, and preferably to sub-atmospheric pressures or substantial degree of vacuum. The removal of moisture is preferably continued by the application of heat to the vessel and maintenance of the lowered pressures until the moisture content of the solids is reduced to the range where the fats and oils may be expressed therefrom in a continuous high pressure press free from glues and mucilaginous substances. For satisfactory pressing in a continuous press, the moisture content of the cracklings or residue should be below 20 per cent, and preferably in the range of 5 to 15 per cent. To speed the step of dehydration or moisture removal, the material is preferably turned over and agitated continuously while it is preferable to reduce the internal temperatures below 212 degrees Fahrenheit in the dehydrating stage as the moisture content of the cracklings or solids goes below 20 per cent to keep the fats free from discoloration and retain their bleachable quality. When handling decomposed materials and dead animals where fats are inherently of low grade, or when the quality of fats is immaterial these precautions may be avoided. Tallow of good color may be produced with internal temperatures up to 240 degrees Fahrenheit as the moisture content of the cracklings or solid residue goes below 20 per cent.

From observations and tests made in the practical application of the invention to various materials, it appears that when the moisture content of the total mass to be rendered is above the range of 50 to 60 per cent, sufficient moisture is present to cause active decomposition of the fats and formation of fatty acids, foaming of the mass, solution of gluey, mucilaginous, and water soluble substances, and the formation of an emulsified mass from which the moisture can be removed to the point where the fats and oils will separate from the solids only with difficulty in the dehydrating stage. The preferred method of handling materials of high moisture content is to remove the excess moisture by heating to drive off the moisture content without permitting disintegrating pressures to form in the vessel until the moisture content of the mass is reduced below the range where decomposition of fats, foaming, solution of water soluble content, and foaming will occur when the pressures are raised and disintegration of the mass sets in. This is preferably effected in practice by venting the moisture initially formed, or by maintaining an initial vacuum in the vessel until the total moisture content of the mass is reduced below about 60 per cent, and this initial dehydrating stage is preferably continued until just enough moisture remains in the mass to generate the required steam pressures during the disintegrating and sterilizing stage. After this excess moisture is removed, the process is carried out as above set forth. As in practically all materials, the natural moisture content is sufficient to cause the generation of non-condensible gases from the materials during the beginning of the disintegrating pressures, and the initial vapors evolved are ordinarily of more or less offensive odor, the vapors evolved at first are preferably removed by an initial vacuum which is maintained until the offensive odors are driven off, before permitting the pressures to rise. In handling all materials the most efficient and satisfactory results are secured by removing the moisture in excess of that required for the generation of effective disintegrating pressures prior to permitting the pressures to rise in the vessel. In this way decomposition of the materials and formation of fatty acids are minimized and the highest possible grades of fats, oils, and meals are produced from the available material.

Preferred forms and arrangements of apparatus for carrying out my invention are disclosed in the accompanying drawings, of which, referring to the drawings:

Figure 1 is a longitudinal section of a preferred construction of the cooking or disintegrating and sterilizing unit.

Figure 2 is a sectional view taken along line AA of Figure 1.

Figure 3:
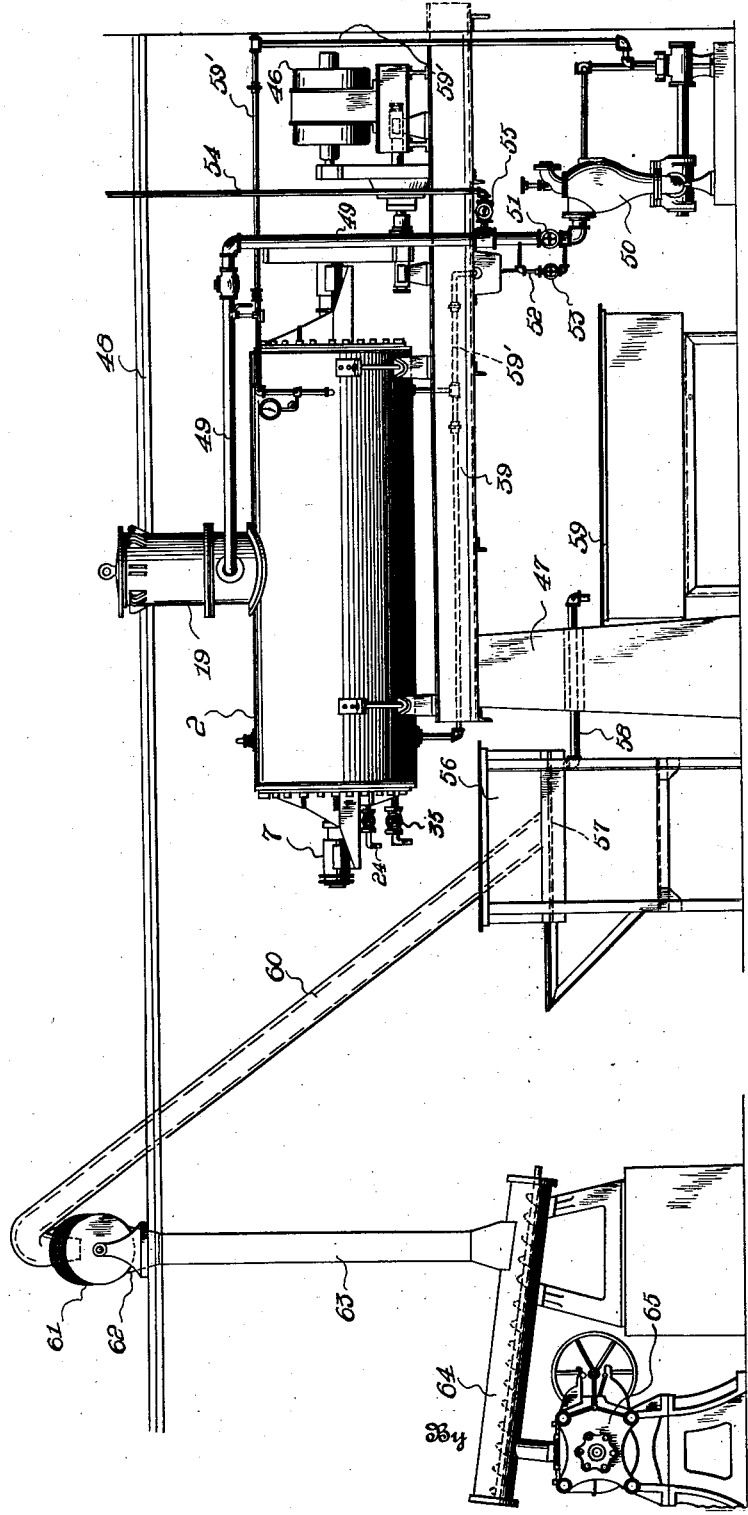
Figure 3 is a diagrammatic representation of a complete apparatus for rendering materials.

Referring to Figure 1, the cooker comprises an inner cylinder 1 which is secured at its ends in the mud rings 2 which in turn fit within and are secured to an outer shell or jacket cylinder 3 which forms a heating jacket for the inner cylinder 1. Secured to the mud rings 2 by studs or any other suitable manner and closing the ends of cylinder 2 are the heads 4 and 5. Supported from each of the heads 4 and 5 are the journals 6 and 7 in which the agitator shaft 8 is journaled. Suitable stuffing boxes or packing members 9 are provided for the shaft 8 at the bearings 6 so that pressure tight joints are formed where the agitator shaft passes into the cylinder 1. A set of agitating and lifting arms 10 are removably secured to the shaft 8 by means of collars 11 and the bolts 12 (Fig. 2). The two adjacent center arms 10 are in alignment with each other, and the remaining arms are spaced at angles of 120 degrees around the shaft so that the arms are disposed in three aligned rows along the shaft 8, as shown in Figure 2. The arrangement of the center arms 10 leaves a central charging space, and the alignment of the remaining arms permits the material to spread uniformly throughout the cylinder 1 from the central opening. Each arm 10 is provided with a flat lifting face 13 and a curved discharging face or surface 14. Formed in the central upper surface of the cylinders 3 and 1 are the charging openings 15 and 16 respectively. A strengthening and spacing ring 17 secured between the cylinders 1 and 3 forms the side walls of the charging passage and seals the heating jacket space from the interior of the cylinder 1. Secured to the outer shell 3 by riveting or in any other suitable manner is a charging dome casting 18 and bolted or secured to the casting 18 is a charging dome extension 19. A cover or charging head 20 is removably clamped in position by means of the securing bolts 21' pivotally secured to extension 19 and which fit into slots 22 formed in the head 20. Standard pipe connections 23 for vacuum line connections are provided in the dome casting 18.

Provided in the head 5 is a sampling cock 24 (Fig. 3) through which samples of the materials may be withdrawn, and through which the vacuum may be broken, as will more fully hereinafter appear. Formed in the lower part of the head 5 with its bottom flush with the bottom of cylinder 1 is a discharge opening 30 through which the materials are discharged from the interior of the cylinder. The opening 30 is closed by a cover 31 which is pivoted to the head 5 and held removably in position by means of the clamping bolts 32 which are pivoted to the head 5. Held in the opening 30 flush with the interior surface of the head 5 is an auxiliary plate 33 which is pivotally secured to the cover 31 by means of the link 34 and suitable pivot and securing pins. Plate 33 prevents lodging of material in the opening 30 when the cover 31 is closed and is withdrawn when 31 is open. Supported in the cover 31 is a suitable grease drain cock 35 through which free grease may be drained.

The cooker body is supported from saddles or supporting castings 37 and is secured thereto by means of bands 38. Saddles 37 in turn are secured to and supported from a structural frame work 39. Shaft 8 is extended at one end beyond bearing 7 and is driven by means of a gear 40 keyed thereto. Gear 40 meshes with and is driven by a countershaft 42. The countershaft 42 is supported from the structural framework 39 by means of journals 43 and is driven by the gear 44 secured thereto. The gear 44 is driven by the pinion 45 which in turn is driven by the reversing motor 46.

The cooker so far described together with the motor and the drive therefor is built in a unitary structure which may be supported at a suitable level for convenient arrangement of the necessary auxiliary apparatus. In the arrangement shown in Figure 3 the self-contained cooker unit is supported from a building wall and a pier 47 or in any other suitable manner so that the charging dome 19 extends through a charging floor 48. A vacuum or vapor discharge pipe line 49 is connected to one of the dome fittings 23 and the other fitting 23 is plugged. The pipe line 49 extends to a vacuum pump 50, of any suitable construction. A valve 51 is provided in the vacuum line 49, so that the pump may be cut off and pressures permitted to build up in the cooker. A by-pass connection 52 with a control valve 53 is provided around the valve 51. A vent connection 54 with a control valve 55 is connected to the vacuum line to permit venting of the generated vapors. Supported beneath the discharge opening of the cooker is a drain pan or tank 56 provided with a screen bottom 57 which permits the free fats and oils to drain from the cracklings or solid residue. A grease connection 58 is provided through which the grease drained from the cracklings or solids in the tank 56 passes to a grease receiving tank 59. Suitable steam supply connections 59' for the cooker jackets and pump are provided. The cracklings or solid residue, after being drained are preferably shoveled into a conveyor 60, carried back to the charging floor and passed through a rotary screen 61 of sufficiently large mesh to separate larger bone particles and foreign substances such as iron, wood and the like from the disintegrated mass. The solids which pass through the screen openings drop into the press feed hopper 62 and pass downward by gravity through the passage 63 to the tempering apparatus or steam jacketed cross feed conveyor 64 where the solids are reheated to a suitable temperature for efficient expressing of the fats remaining therein. From 64 the materials pass continuously into a high pressure screw press 65 and are expressed at pressures ranging approximately from five hundred pounds per square inch upward to twenty thousand pounds per square inch or more until the remaining fats and oils are largely removed from the solids. Screw presses of the character suited for use in the present processes are well known in U. S. Patents 836,701; 829,315; and 1,049,834.

Operation.

The operation of the process is varied in details in accordance with the nature of the products to be rendered. The highest grade of products which are rendered in practice are the animal parts from which edible fats are produced. Such animal parts are high in fat content and have relatively low moisture and solid or meat fiber content. The fat content in such materials ordinarily ranges from 60 to 80 per cent of the total charge but may be as high as 92 per cent, the natural moisture content ranges from 5 to 20 per cent, and the remaining solids such as meat fibres and tissue structure will range from 2 to 20 per cent of the total. In handling a charge or batch of this class of material in a cooker, which will handle a batch of 4,000 pounds, the motor is started into operation and the agitators are rotated at a speed of from 10 to 20 revolutions per minute, in the direction shown by the arrow in Figure 2. At the same time steam under a pressure of preferably 25 to 75 pounds per square inch or more is circulated through the jacket of the cooker, from the steam lines 59', and the materials to be rendered are fed into the cooker from the charging floor 48 through the charging dome 19. The materials entering into the cooker are preferably in pieces such as are trimmed or cut from the animal carcass. The agitation and heating are continued as the charging proceed, and the cooker is preferably filled to the point where the mass rotates as a unit with the agitator shaft. When filled to this extent the material in the initial stages will rub against the interior surface of the cooker and will wipe the surface clean so that a sanitary condition is maintained in the cooker. After the cylinder 1 is filled which will ordinarily consume about 10 to 15 minutes, the charging dome cover 20 is clamped tightly in place and the cooker body is then sealed except for the vacuum or venting connections. As the moisture content of the total charge is substantially below 50 per cent and the materials should be fresh, the vacuum line valve 51 may be immediately closed and the pressures in the cooker permitted to rise. However, even with the highest grade products some decomposition and fermentation will have set in, and in the beginning of the operation, the evolved gases will have a slight offensive odor. These initially evolved gases and the air contained in the cooker are preferably withdrawn from the cooker by opening the vent valve 55 or by operating the vacuum pump until the offensive odors disappear before permitting the pressures to materially build up in the cooker. When the odors disappear the moisture content of the mass has apparently been lowerd to the point where fermentation and active decomposition is arrested and thereafter clean steam is evolved from the mass. The initial gases may also be removed and fermentation arrested by closing the main valve 51, opening the by-pass valve 53, and operating the vacuum pump slowly to remove the initially evolved gases and at the same time to permit the pressures in the cooker to rise. The heat is so applied and by-pass valve 53 is set so that the pressures in the cooker will reach from 15 to 40 pounds per square inch in the first 15 or 20 minutes after the cooker is closed. Thereafter the generated vapors are withdrawn at such a rate that according to the product the pressure remains at 15 to 40 pounds per square inch until the materials are reduced to a sticky and more or less disintegrated condition. When this condition is reached the moisture content of the cracklings should be above 17 per cent and should preferably be below 35 per cent. the major portion of the fats is freed from the solid structure, and the mass is thoroughly sterilized. During the disintegrating period the withdrawal of the excess vapors removes a substantial portion of the moisture content of the mass and at the same time the disintegration proceeds at controlled temperatures and pressures. The disintegration stage is usually completed at the end of from 45 to 60 minutes with the pressure at 15 to 40 pounds per square inch, according to the product, during which time the generated excess steam is continuously withdrawn. As the fats melt out of the solids and the moisture content decreases, the volume of the material will be reduced and the solid structure of the materials is disintegrated by the agitation and action of the pressures. The speed of rotation and the spacing of the agitator arms is such that as the volume of the material in the cooker is reduced and the disintegration proceeds, the materials will be raised in the cooker and then are dropped downward. The angular spacing of the arms 10 should be such that this tumbling and turning over of the material is permitted as the disintegration proceeds, and the most effective relative spacing of the arms around the beater shaft for efficient operation is the 120 degree angle shown.

After the desired degree of disintegration has been attained, the remaining moisture in the material is removed as rapidly as possible from the mass to the point where the fats may be expressed from the solid residue free from gluey or mucilaginous substances. The moisture is preferably reduced until the moisture content of the cracklings or solid residue is below 20 per cent and preferably in the range of 5 to 15 per cent. At the same time the temperatures of the mass are lowered sufficiently to prevent absorption of glues by the fat, discoloration of the fats and destruction of bleachability of the fats, as the moisture content of the solid residue is lowered. While the injury to fats occurs at temperatures above about 220 degrees Fahrenheit with the moisture content of the cracklings or solid residue below about 16 per cent, a safe margin for variations in the manner of operation and in the nature of the materials should be allowed. If the temperatures are lowered when the solid residue is in the sticky stage, the moisture content of the cracklings will be above 20 per cent and high quality fats will be obtained. The sticky stage of cracklings accordingly marks a good practical point for the reduction of temperatures of the mass. This lowering of the temperatures is accomplished by opening by-pass valve 53 and then the valve 51 and operating the vacuum pump to lower the pressures and temperatures rapidly below 240 degrees Fahrenheit with steam pressure maintained on the jacket of the cooker. To speed the dehydration or removal of moisture to the point where clear fats, free from gluey or mucilaginous substances may be expressed from the solid residue, the vacuum pump is preferably operated in a manner to reduce the pressure in the cooker substantially below atmospheric pressure. In practice the pressure in the cooker has been reduced to below atmospheric pressure in about 5 minutes after starting to reduce the pressure. At this stage the cracklings or solid residue will have reached a golden brown or crisped state, and to avoid further disintegration or grinding of the cracklings by the agitators to the point where they will not settle easily in the fats, the agitators are preferably stopped. Depending upon the condition of the material and extent of dehydration, shortly before the agitators are stopped the jacket temperatures are preferably lowered by reducing or cutting of the jacket steam pressure. The mass containing a large percentage of fats is then permitted to settle and the pump is operated to establish and maintain the maximum attainable vacuum in the cooker to further cool and dehydrate the mass. In this period a vacuum of 20 to 25 inches is, in practice, established, and moisture is continuously withdrawn until the moisture content of the solid residue or cracklings is preferably below 15 per cent. In practice the desired settling and dehydrated condition of the mass is reached about 20 to 30 minutes after the agitators are stopped.

After the mass has settled, pressure is admitted into the cooker to break the vacuum by opening cock 35 or by opening sampling cock 24. The fats can be withdrawn first through the cock 35, the discharge opening 30 is uncovered, and the agitators are then rotated in reverse direction to that employed during the step of disintegration. The remaining hot fats and the solid residue or cracklings will then be pushed out of the discharge opening into the drain pan 56 by the discharge faces 14 of the agitator arms. In the drain pan the free hot fats will pass downward through screen 57 while the solids or cracklings remain on the screen. From the bottom of pan 56 the hot fats pass through pipe 58 to the grease receiver 59.

When the mass has been properly rendered, the cracklings will be a mass of golden brown crisped particles and will feel sandy to the touch. In the production of lard, ordinary bones can be in the materials as they are easily removed, and the cracklings freed from the bones may be passed directly to the high pressure screw press 65 in which the clear fats free from gluey and mucilaginous substances are expressed from the solids at pressures ranging from several hundred pounds per square inch upward. The cake from the press is a high grade thoroughly sterilized and edible product with high water solubility and low fiber content, which may be utilized as food for human beings. The fats produced are clear and free from discoloring substances and are bleachable in nature, and in the case of lard, the fats have a superior kettle lard flavor.

Materials such as shop fats, market scraps and the like which contain varying amounts of bone, will range ordinarily from 15 to 40 or 50 per cent moisture, and from 20 to about 60 per cent of fats. This type of material varies widely in character and is ordinarily in a more or less decomposed state when charged into the cooker. The rendering operation is carried out substantially as above set forth, except that the initial removal of moisture and gases may be prolonged to remove surplus moisture before generating the disintegrating pressures. The cooker pressures are preferably higher in the distintegrating stage and may range as high as 60 pounds per square inch inside the cooker or more to effect the disintegration or reduction of bone content to a mushy digested condition, and the pressures are generally maintained from one to two hours. Because of the higher moisture content, the final vacuum or low pressure stage is lengthened to effect the necessary dehydration of the solid residue or cracklings to a moisture content suitable for satisfactory expressing of clear fats from the solid residue after the free fats have been drained away. This stage may range from one to two hours. The temperature of the jacket may be reduced to permit the fats to cool in the vacuum stage to the condition where the fats will not be substantially injured or the jacket temperatures may be kept high and the vacuum period shortened to prevent the temperature of the fat from rising to the point where bleachability and color are injured as the moisture is removed. So long as the temperatures of the fat are kept below the point where injury to quality occurs as the moisture content of the mass decreases the jacket temperatures are immaterial and will depend upon the percentage of fats in the materials being rendered. Bone particles which have not been disintegrated to the necessary degree are preferably separated from the remainder of the solids in the screen 61 and are fed into the cooker with the succeeding batch, while the solids which pass through the screen are continuously expressed in the press 65. The solid residue from the press for this character of material may be ground and used as a high grade thoroughly sterilized stock food which will have a fiber content ranging from ½ to 2 per cent, and is more than 70 per cent water soluble and available for absorption.

Dead animals and condemned carcasses ordinarily range from 50 to 60 per cent in total moisture content, from about 10 to 20 per cent fat content and the remainder solids. In rendering materials of this character, the carcasses are dismembered or disjointed and cut into pieces that will fit into the charging opening. Large pieces such as heads, feet and shin bones and the like can be crushed into smaller pieces, but this is not essential as the disintegration may be effected by the action of the steam pressure in the cooker. Entrails are preferably hashed and washed to remove manure and foreign substances. In treating materials of this character the initial removal of gases is preferably continued under a vacuum until the odors disappear, but as the moisture content is in the range of 50 to 60 per cent, pressures may be permitted to rise immediately and the venting may be carried out through the by-pass to allow the escape of foul gases. To effect disintegration of this character of material until the mass is in a sticky or gummy condition, inside pressures of 35 to 60 or more pounds per square inch and preferably above 40 pounds per square inch are permitted to develop for from two to three hours. At the completion of the disintegration the materials are thoroughly sterilized and the solid residue from diseased animal carcasses and decomposed animal parts may be made into stock food without danger of transmitting diseases. The manufacture of sterilized stock food from diseased animal parts is an important and valuable feature of the present invention. After disintegration, the reduced pressure or vacuum stage requires ordinarily from two to three hours at temperatures of 165 to 240 degees Fahrenheit before the moisture content is lowered to the point where the fats may be expressed free of glues and mucilaginous substances. There is seldom enough fat or oil content in this type of material to have free fat drain away, and at the completion of the dehydration the material in the cooker is usually a dry granular mass or meal. Before pressing this material it is preferably screened to remove large bone particles which have not been thoroughly disintegrated, and the screened meal is pressed to remove the fats. A batch consisting of three condemned cows comprising a total weight of 2197 pounds high in fat treated in accordance with this process gave a yield of 19 per cent fat content and the bone content is ordinarily more than 70 to 80 per cent water soluble, and is thoroughly sterilized.

The usual run of animal tissues and membranes comprising packinghouse offal which goes into the production of inedible fats, such as tripes, pecks, bung gut ends, hog black guts, slunks and the like, range from 60 to 85 per cent in moisture content and from 4 to 25 per cent in fat. These materials are preferably hashed and washed prior to rendering and will absorb a considerable percentage of moisture in the course of washing. In handling this class of material, the moisture is withdrawn in the initial stage until the moisture content is reduced below 50 to 60 per cent of the total mass prior to permitting the pressures to rise in the cooker. In practice this material is satisfactorily handled by maintaining jacket pressures of about 70 to 80 pounds throughout most of the operation. For about an hour the steam from the material is removed rapidly enough to maintain a slight vacuum. In the next half hour the pressures in the cooker are permitted to rise until 35 pounds pressure per square inch is reached. The pressure of 35 pounds is maintained for about half an hour, and then the pressure is gradually reduced by use of the by-pass valve to atmospheric pressure and then to a vacuum by opening the vacuum line valve. The vacuum is then increased as rapidly as possible and is maintained as high as possible until at the end of about another hour the dehydration is completed. The jacket pressures are preferably cut off during the last stage of this vacuum. The final dehydrating period may be shortened by adding sufficient free fats at the end of the digesting to prevent the material from going into a doughy mass.

In the foregoing disclosure moisture contents of cracklings or solid residue have been given based on the percentages determined by draining free fats and oils away from the solids and obtaining the percentages without removing the remaining fats and oils from the solid residue.

While specific examples of average approximate moisture and fat contents of various materials have been given, it will be understood that these quantities will vary widely in practice with different materials, and that the principles of the invention are applicable to the rendering of solid materials in general which contain oils or fats of animal origin. It will also be understood that the specific limits of times and pressures are subject to wide variations in the discretion of the operator, and the particular methods of carrying out the invention are to be varied to give the most satisfactory results in accordance with materials to be rendered, and the methods of applying the principles of the invention herein set forth will be varied to meet the particular conditions in the manner found by trial to be most satisfactory, and wide variations may be made by those skilled in the art without departing from the spirit of my invention.

Disintegrating steam pressures ranging up to 100 pounds per square inch or more may be utilized in accordance with the nature of the materials to be rendered, and the time of the disintegrating stage may range up to 6 hours or more. The time of dehydration after disintegration may range up to 4 hours or more, and the jacket steam pressures may range from zero to 125 pounds per square inch or more during the latter part of the dehydration stage, depending upon the quality of fats to be produced.

Having described preferred embodiments of my invention, what is desired to be secured by Letters Patent and claimed as new is:

1. In a process of rendering fat and oil containing solids of animal origin, the steps which comprise heating the materials to be rendered sufficiently high to develop disintegrating steam pressures substantially above atmospheric pressure and temperatures above 240 degrees Fahrenheit in the materials from the moisture present therein, and simultaneously removing portions of the moisture therefrom in the form of steam and melting the fats and oils contained in the materials until the moisture content of the solid residue thereof has been reduced to the range of 17 to 35 percent; thereupon reducing the temperature to the range of 165° to 240° Fahrenheit and the pressure to sub-atmospheric and continuing the removal of moisture until the moisture content of the solid residue is reduced to the range of 5 to 15 percent.

2. The step in a process of rendering fat and oil containing solids of animal origin which comprises disintegrating the materials to be rendered and melting the fats and oils contained therein by agitating and heating to temperatures substantially above 212 degrees Fahrenheit, whereby disintegrating steam pressures are developed therein from the moisture present in the materials and fats and oils are melted therefrom while the total moisture content of the materials is less than 60 percent and before the moisture content of the solid residue is reduced to 17 percent.

3. The step as set forth in claim 2 together with the step of removing further moisture from the materials, after disintegration, at sub-atmospheric pressures and reduced temperatures until the moisture content of the solid residue is reduced substantially below 15 percent.

4. The process of rendering fat containing solids of animal origin which comprises agitating and heating the materials to be rendered at temperatures and pressures not sufficiently high to cause substantial disintegration of the materials and separation of fats and oils therefrom before the moisture content thereof is reduced to 60 percent; then agitating and heating the materials above 240° Fahrenheit while disintegrating steam pressures substantially above atmospheric pressure developed in the material from the natural moisture content thereof are maintained thereon, and disintegration of the materials together with melting of fats and oils contained therein is effected while the moisture content of the solid residue is above 17 percent; and then further agitating and heating the disintegrated materials at sub-atmospheric pressures and temperatures below 240° Fahrenheit and removing the moisture therefrom until the moisture content of the solid residue is substantially below 15 percent, and then expressing the solid residue to separate residual fats and oils therefrom.

5. In the process of rendering fat and oil containing solids of animal origin the steps which comprise digesting the material to be rendered at temperatures substantially above 212° Fahrenheit and with steam pressures above atmospheric pressure, developed from the moisture contained therein to disintegrate the solid structure thereof and to melt fats and oils contained therein while maintaining the moisture content of the solid residue sufficiently high to hold the glues and mucilaginous substances in the solid residue of the materials, and not sufficiently high to cause formation of an emulsion of the fats and oils as the materials disintegrate.

6. The process as set forth in claim 5, together with the step of removing further moisture from the materials, after the step of disintegration, at sub-atmospheric pressures and reduced temperatures until the moisture content of the solid residue is reduced substantially below 15 percent.

In witness whereof I affix my signature.

WILLIAM LAABS.